Figure 1A:
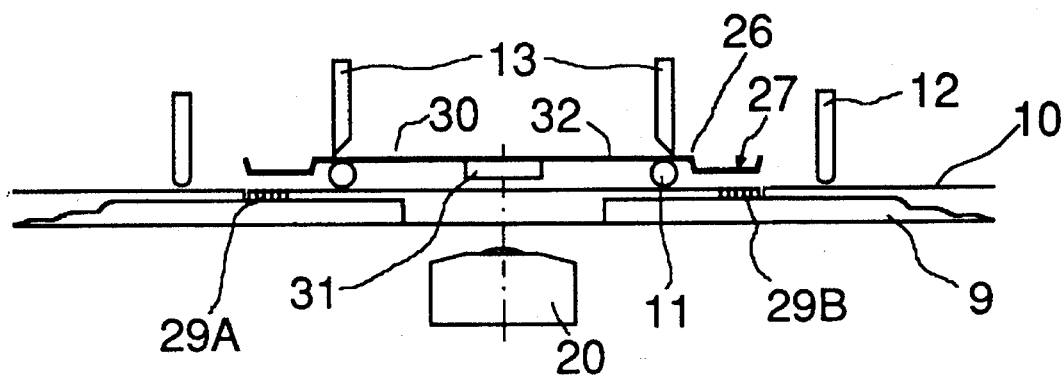

United States Patent

Schaeffer et al.

[11] Patent Number: 5,477,406
[45] Date of Patent: Dec. 19, 1995

[54] PRESSURE DEVICE FOR RECORDING MEDIA IN A TAPE CASSETTE

[75] Inventors: Norbert Schaeffer, Deidesheim; Klaus Schoettle, Heidelberg; Reinhard Stransky, Erpolzheim; Klaus Goetz, Neustadt, all of Germany

[73] Assignee: BASF Magnetic GmbH, Mannheim, Germany

[21] Appl. No.: 191,534

[22] Filed: Feb. 4, 1994

[30] Foreign Application Priority Data

Feb. 6, 1993 [DE] Germany .................. 9301653 U

[51] Int. Cl.⁶ .................................................. G11B 15/60
[52] U.S. Cl. .................................................. 360/130.33
[58] Field of Search ........................ 360/130.3–130.33, 360/137; 242/199–201, 346, 346.1

[56] References Cited

U.S. PATENT DOCUMENTS

| | | | |
|---|---|---|---|
| 4,087,845 | 5/1978 | Saito | 360/130.3 |
| 4,131,243 | 12/1978 | Machida . | |
| 4,380,035 | 4/1983 | Ota et al. | 360/130.33 |
| 4,506,846 | 3/1985 | Gelardi et al. | 360/130.33 |
| 4,564,157 | 1/1986 | Oishi et al. | 360/130.33 |
| 4,593,335 | 6/1986 | Sato et al. | 360/130.33 |
| 4,747,007 | 5/1988 | Ikebe et al. | 360/130.33 |
| 4,942,492 | 7/1990 | Che | 360/130.33 |
| 5,074,486 | 12/1991 | Vollmann | 360/130.33 |
| 5,309,302 | 5/1994 | Vollmann | 360/96.1 |
| 5,396,392 | 3/1995 | Watanabe et al. | 360/132 |

FOREIGN PATENT DOCUMENTS 096983 12/1983 European Pat. Off. .

Primary Examiner—Stuart S. Levy
Assistant Examiner—Brian E. Miller
Attorney, Agent, or Firm—Keil & Weinkauf

[57] ABSTRACT

A pressure device for recording media in tape form, in particular magnetic tapes, has at least one pressure element and comprises a support element. When the device is actuated by the head coming to bear, a deflection of the device takes place, and a pressing against the recording medium is effected automatically by at least one extension of the support element, this pressing ending automatically when the head is no longer in bearing contact. The bearing pressure may take place directly on the tape rear side or tape front side, or else indirectly on the tape front side or the tape rear side or both sides simultaneously. Pressing and/or antifriction and/or cleaning elements may also be arranged, at least partially, fixed in place with respect to the tape. The invention can be used in the case of all cassettes, film and magnetic-tape systems.

16 Claims, 5 Drawing Sheets

PRESSURE DEVICE FOR RECORDING MEDIA IN A TAPE CASSETTE

The invention relates to a pressure device for recording media in tape form, in particular magnetic tapes in magnetic-tape cassettes, the recording medium being assigned at least one pressure element and being provided in an interacting manner with at least one support element, mounted on at least one mounting element, and the scanning member effecting in the operating position a deflection of the support element and of the at least one pressure element with respect to the mounting element, whereby the recording medium is pressed against the scanning member.

DE-A-26 34 161 discloses for a magnetic-tape cassette a double-armed spring with pressing elements for each of two heads, the same bearing pressures being set upon engagement of one or two heads with the tape by means of a special boss-mounting of the spring. Even if only one head comes into contact with the tape and one of the pressing elements, the other pressing element does not come to bear against the tape.

EP-A 96 983 discloses a magnetic-tape cassette having a double-armed pressing spring with a felt pad at each of the ends, which spring is mounted such that the tape is in constant contact with both felt pads in order to bring about tape running around a capstan passage opening in the cassette housing. Even when a single head is brought towards one felt pad, the other felt pad remains in contact with the tape.

It is an object of the present invention to design a pressure device for recording media in tape form and a cassette therewith in such a way that, depending on the operating state of the recording medium on the machine in recording/playback mode, the pressure device bears with pressure force against the recording medium or does not or else bears substantially pressureless against it.

In particular, it is disadvantageous in the case of cassette systems with highly sensitive recording media, in particular magnetic tapes, if a pressure or cleaning device bears constantly with pressure force against the tape, so that the tape surface is damaged. In such cassette systems, according to the object set here, it must be ensured that the pressing and/or cleaning device has pressure contact with the tape only when the magnetic head or heads are in engagement with the tape.

We have found that this object is achieved according to the invention with a pressure device for recording media in tape form, in particular magnetic tapes in cassettes, as claimed in this application, by extension arms, projecting on both sides of the support element laterally beyond the mounting element and having end parts which, in the non-deflected position of the support element, do not bear or bear substantially pressurelessly against the recording medium and which, in the deflected position of the support element, bear with pressure force against the recording medium.

This advantageously achieves the effect that, without further switching-over or setting measures, the pressure device automatically comes into pressure contact with the recording medium by the engaging of the scanning member and comes out of pressure contact with the recording medium by the disengaging of the scanning member. Consequently, the switching on and off is coupled in a simple way to the respective operating state of the recording medium in the machine. The pressure device consequently always comes into action whenever in recording/playback mode the risk of mechanical or electrical disturbance is greatest, for example due to a lack of tape tension, which has an effect on wrapping around the head, or due to particles which there may be on the tape and may get on the scanning member.

In a first version, a central pressure element is provided directly on the support element. The deflection to be performed by the scanning member in this case takes place indirectly via the central pressure element, so that the degree of deflection depends both on the instantaneous thickness and on the instantaneous flexibility of the pressure element.

In a second version, the support element is provided with a cutout for the passage of a pressure element. The pressure element is in this case mounted such that it is separately resilient. The deflection by the scanning member in this case takes place directly by the deflection of the frame-like support element and is consequently independent of the materials and dimensions of any pressure elements which may be interacting with it.

In a practical development, the end parts of the extension arms may be provided with side pressure elements for the recording medium. As an alternative version, it is also possible to provide the end parts with antifriction elements for the recording medium. It is also possible in practice to design the end parts themselves as contact pressing elements for the rear side of the recording medium.

The central and/or side pressure elements may comprise a nonwoven, felt or velour material.

It is also advantageous if the support element and the extension arms consist of spring steel, chrome-nickel steel or bronze, but it is also favorable to produce said parts from plastic.

The end parts of the extension arms may expediently be designed as bent-off contact surfaces. It is also conceivable to design the end parts of the extension arms as bent-off contact ribs, for distributing any abrasion into rib structures. The end parts may also favorably be designed as bent-off arcuate or cylindrical moldings, to achieve specific pressing and/or cleaning effects.

We have found that, with a cassette which has a front wall with at least one entry opening for the scanning member and a pressure device which is arranged behind the entry opening and in which the recording medium runs between the pressure device and the front side of the cassette, there being provided, seen from the front side of the cassette, at least one fixed-in-place mounting element, which in each case forms bearing points at a distance from the center of the entry opening, the pressure device having a support element mounted on the at least one mounting element and there being provided at least one tape-pressing element, interacting with said support element, and a scanning member effecting in the operating position a reversible deflection of the support element and of the at least one pressure element, the object is achieved according to the invention by extension arms projecting on both sides of the support element laterally beyond the mounting element and having end parts which, in the non-deflected position of the support element, do not bear or bear substantially pressurelessly against the recording medium and which, in the deflected position of the support element, bear with pressure force against the recording medium.

Consequently, according to the invention a cassette having the surprising advantages of a pressure device which can be switched on and off automatically is provided.

In a further practical development of the cassette, the end parts are designed as contact pressure elements for the tape rear side, and in the contact position on the recording medium there are provided on the opposite side of the recording medium, on the inner side of the front wall, pressure elements and/or cleaning and/or anti-friction elements, which in the contact position of the contact pressing elements on the rear side of the recording medium are in contact with the front side of the recording medium.

This achieves the effect that, from the rear side of the recording medium, the pressing takes place against pressure elements and/or cleaning and/or antifriction elements fixed to the cassette.

If the contact pressure elements are likewise provided with suitable material, even tape cleaning on both sides can be achieved.

The pressure elements and/or cleaning and/or antifriction elements may expediently comprise a nonwoven, felt, velour material and/or an antifriction polymer material, in particular PTFE or ultrahigh molecular weight polyethylene (UHMW-PE).

Figure 1B:
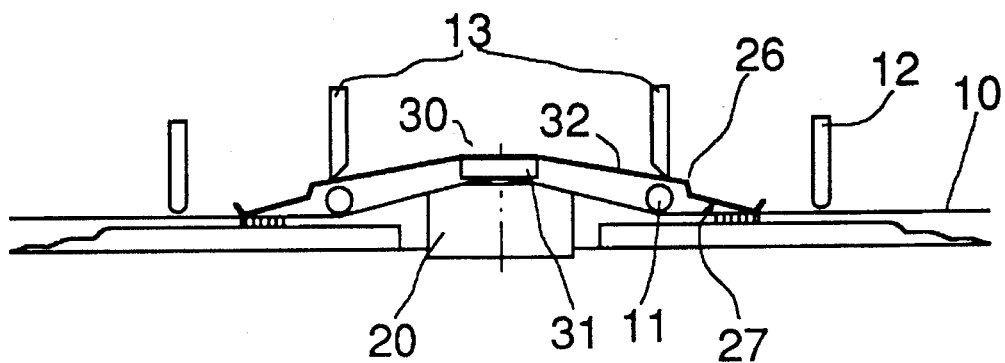
Figure 1C:
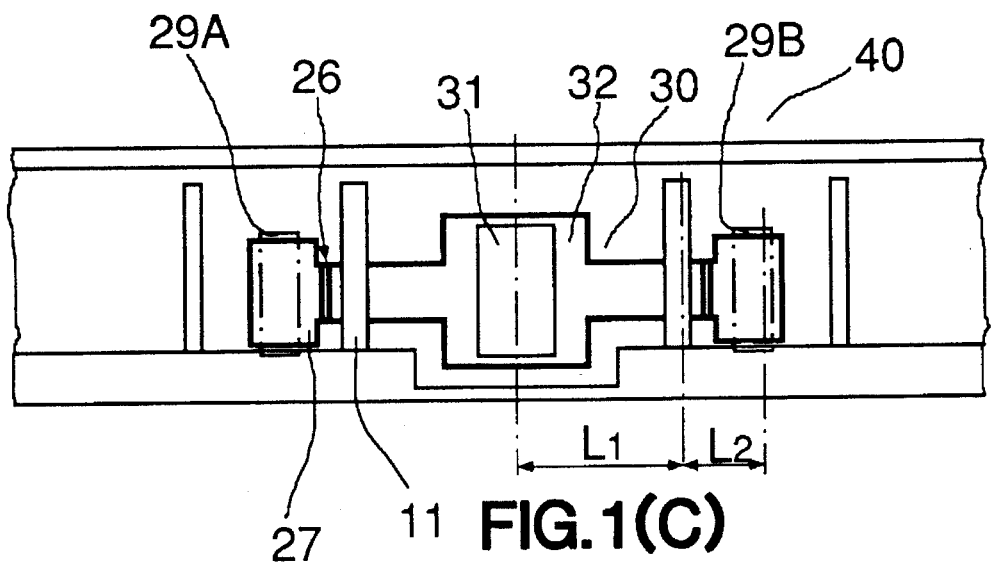
Figure 2A:
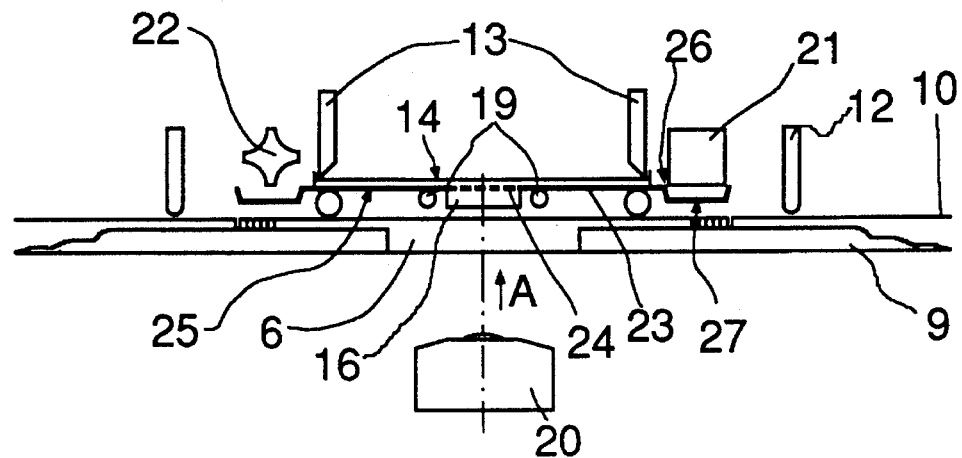
Figure 2B:
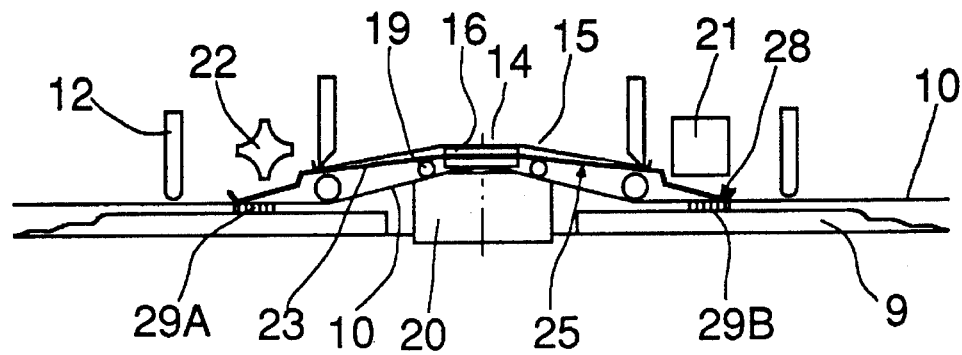
Figure 2C:
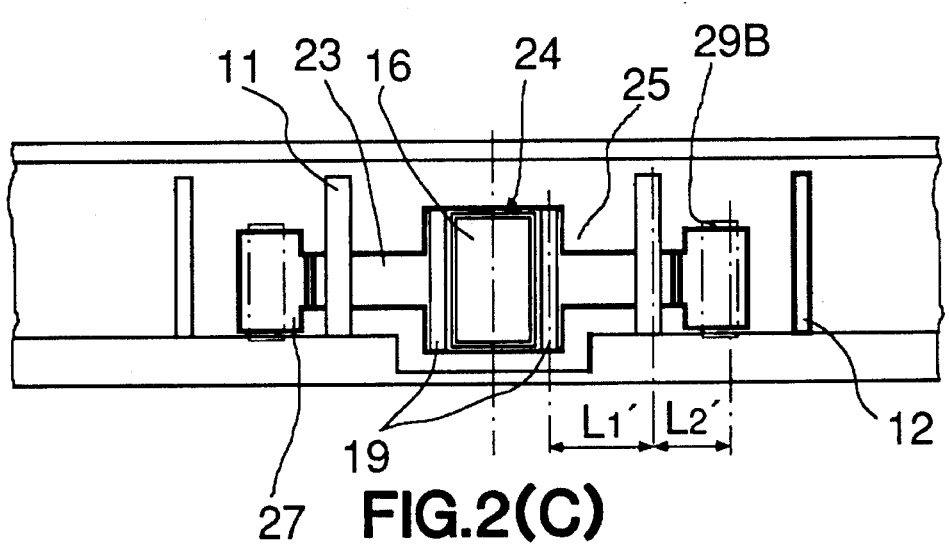
Figure 3A:
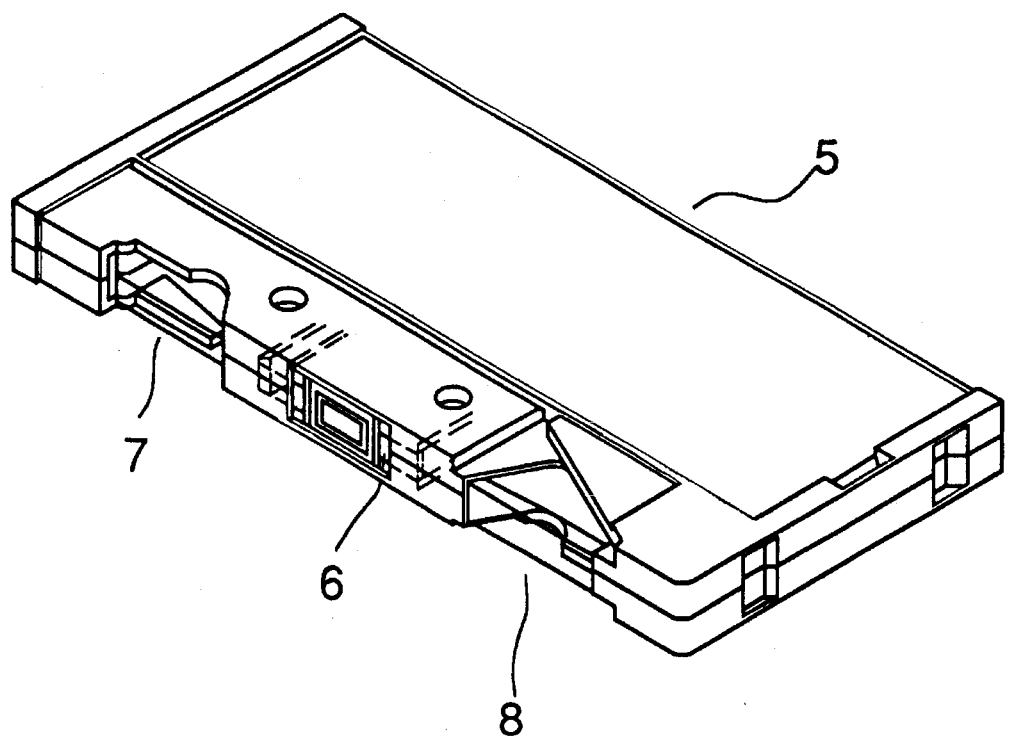
Figure 3B:
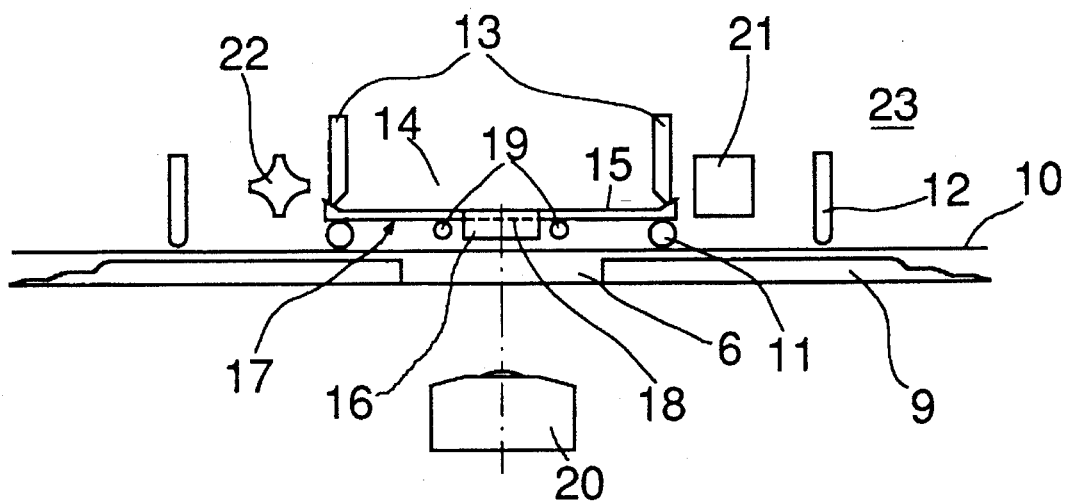

The invention is described below with reference to exemplary embodiments represented in the drawing, in which:

FIG. 1A shows a diagrammatic cutout plan view the front part of a cassette according to the invention with a pressure device in the position of rest FIG. 1B shows the cutout plan view according to FIG. 1A with pressure device in the operating position FIG. 1C shows a partial front view of the cassette according to the invention with pressure device according to FIGS. 1A and 1B but without head and tape FIG. 2A shows a diagrammatic cutout plan view of the front part of a DCC cassette according to the invention with a pressure device in the position of rest FIG. 2B shows the cutout plan view according to FIG. 2A with the pressure device in the operating position FIG. 2C shows a partial front view of the DCC cassette according to the invention with pressure device according to the invention and with a known central tape pressure device, but without head and tape FIG. 3A shows a DCC cassette without closure part in perspective with the pressure devices according to the prior art FIG. 3B shows a diagrammatic cutout plan view of the DCC cassette in FIG. 3A with pressure devices in the position of rest FIGS. 4A–4C and FIGS. 5A–5C show configurations of pressure devices according to the invention.

In FIG. 3A, the DCC cassette 5 is represented in perspective without the recording medium i.e. the magnetic tape and without closure part. On its front side, the head entry opening 6 can be seen in the center and further openings 7 and 8 for guiding and positioning members can be seen to the right and left of it. In the cutout plan view in FIG. 3B, the elements behind the opening 6 which can be seen only with difficulty in FIG. 3A can be seen better. Behind the front wall 9 runs the tape 10, guided by pins 11 and webs 12. Behind the pins 11 there are blade-shaped mounting elements as webs 13 for a pressing spring 14 with a two-armed spring 15 as the support element, in the center of which the pressure element is attached as a felt pad 16. Provided in front of the pressing spring 14 is a frame part 17 with an opening 18 for the passage of the felt pad 16, there being fastened on the frame part 17 to the right and left of the opening 18 positioning pins 19, which are intended to support and align said frame part on the head 20 when the latter enters. The felt pad 16 is freely movable in the frame opening 18 upon head entry, as further revealed by FIGS. 2A–C. The securing of the pressing spring 14 and of the frame part 17 takes place between pin 11 and retaining webs 13. Cutouts 21 and 22 in the bottom wall 23 of the cassette 5 are characteristic of the DCC cassette.

In FIG. 2, the pressure device 25 according to the invention is represented in a DCC cassette as a cutout plan view as in FIG. 3B. The same parts are denoted by the same numbers.

Here, the pressure device 25 is provided with an opening or a cutout 24 in the central region, and on the support element 23, which corresponds approximately to the frame part 17 in FIG. 3B, there are provided extension arms 26, which do not come into contact with the tape 10 or to bear against the tape 10, or do so substantially pressurelessly, with their end parts 27. The extension arms 26 begin where in FIG. 3B the frame part 17 ends, and the extension arms 26 are adjoined by the end parts 27 as actual pressure parts. FIG. 2A shows the position of rest, in which the end parts 27 are not in contact with the tape 10 and the felt pad 16 of the pressing spring 14 protrudes completely through the cutout 24 of the pressure device 25. In this position of rest, the end parts may also just bear against the tape virtually without pressure, with a bearing pressure force of at most 0.5 cN, for example if there is no alternative due to the spatial conditions in the cassette.

The extension arms 26 may also be fastened on existing frame parts 17 in a suitable form, for example by means of welding, adhesive bonding, etc.

If the head 20 is then displaced in the direction of the arrow A into the head entry opening 6 and comes to bear against the felt pad 16, the latter is displaced rearwardly on account of the bending deflection of the spring 15 in direction A in the cutout 24 until the positioning pins 19 bear laterally against the head 20. This position is shown in FIG. 2B. Attached on the inner side of the front wall 9 are pressure elements which also can comprise cleaning and/or antifriction functions, referred to hereinafter as "pressure elements" 29 A, B for short, in the form of pads, strips or platelets etc., on the side of the tape 10 opposite the contact point 28 between end part 27 and tape 10.

When the head 20 enters, not only does the spring 15 of the felt pressing spring 14 bend, but so too does the pressure device 25, in direction A, and experiences a deflection. On account of the mounting element comprising the webs B, this deflection is passed on by means of leverage to its full or an increased extent to the end parts 27 of the pressure device 25, whereby the tape contact or the tape pressure contact is established. Since the pressure elements 29 A and B are present, the tape front side is pressed there against in the operating position with predetermined force. The pressure forces in the operating position are to lie in the broad range from about 1 to about 10 cN (centinewtons), in particular in the range from about 2 to about 5 cN, and in a case where tested in practice were measured in the range from about 2.5 to about 3.5 cN. The chosen pressure forces depend on the intended effect, specifically on whether pressing only is intended, for example for braking or tape-tensioning purposes, or whether cleaning only or additionally is intended—in the case described the tape front side, in the case yet to be described also the tape front and rear sides—or whether pressing only is intended, to avoid tape flutter or similar tape running disturbances.

The magnitude of the bearing pressure force depends on the distances L1 and L2, a greater deflection at the point 28 advantageously being obtained if L2>L1. A favorable choice of this setting is possible within limits which lie in the spatial construction of the DCC cassette.

In FIGS. 1A–1C, views of a further pressure device 30 according to the invention are represented, the latter differing from the pressure device 25 by the absence of a cutout. Fastened on the central part of this flexible pressure device 30 is a central pressure element 31, comprising the usual head pressing materials of felt, nonwoven, velour or the like. Retaining webs 13 and pins 11 are again represented as mounting elements. However, any desired cassette 40 is concerned, even if some of the designations have been taken over from FIGS. 2 and 3. The pressing mechanism is the same as in FIG. 2, except that the head 20 deflects the central pressure element 31 directly. Pressure elements 29A and B are likewise present, and the bearing pressure forces lie in the same ranges. The support element 32 is designed as an enlarged plate, from which the narrower spring arms extend. The extension arms 26 and end parts 27 are again present; similarly, the same length ratios of L2 and L1 as specified above apply.

In FIGS. 4 and 5, more detailed practical exemplary embodiments of the pressure devices according to the invention are then represented.

FIG. 4A shows once again the pressure device 30 from FIG. 1 in front view and plan view, with the end parts 27, which are designed as bent-off contact surfaces. FIG. 4B represents a pressure device 33, the end parts 34 of which differ due to their circular or arcuate shape. FIG. 4C shows end parts 35 of a pressure device 36 which are designed in a ribbed or corrugated shape.

Figure 5A:
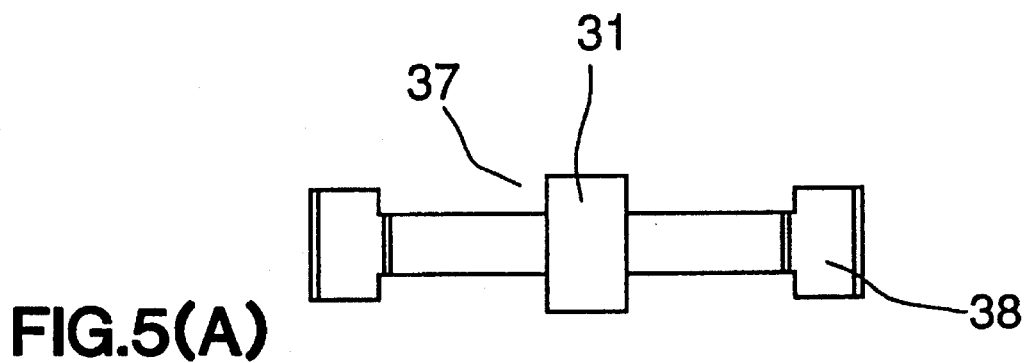
Figure 5B:
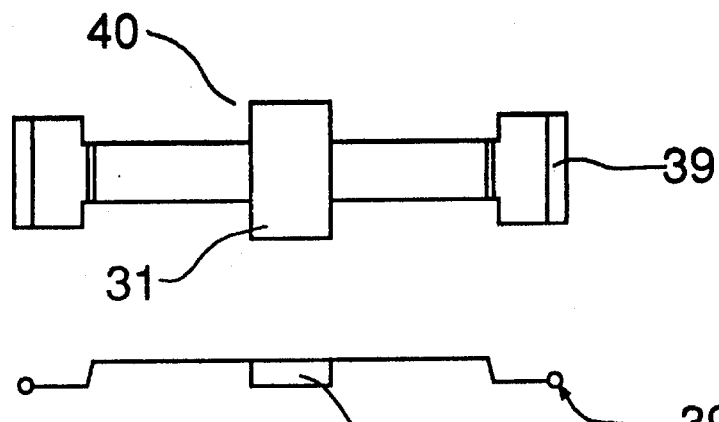

FIG. 5A shows a pressure device 37, the end parts 38 of which are provided with pressure elements of materials described above. FIG. 5B represents a pressure device 40 with cylindrical elements on the end parts 39.

Figure 5C:
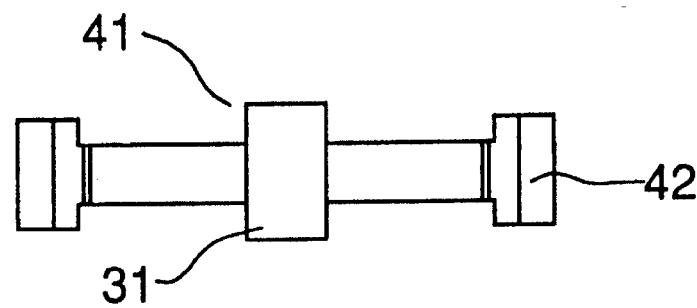

FIG. 5C shows a pressure device 41 with pressure elements in strip or platelet form on the end parts 42, of one or more of the materials specified above.

Figure 4A:
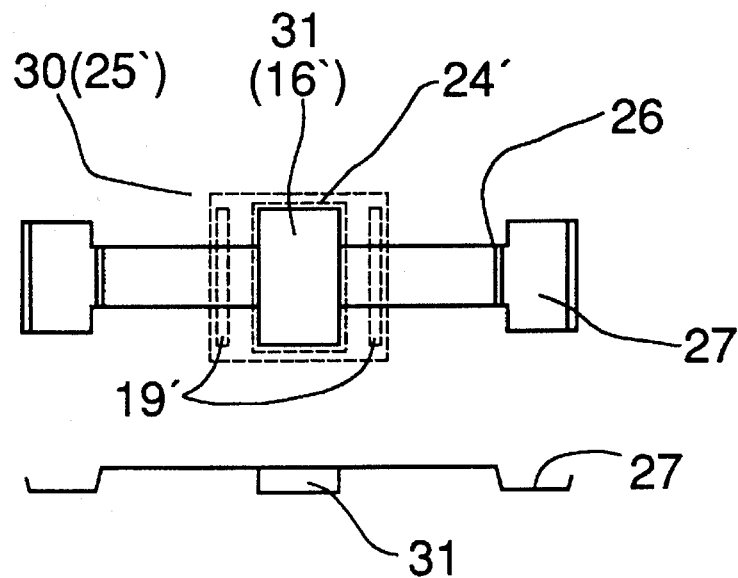
Figure 4B:
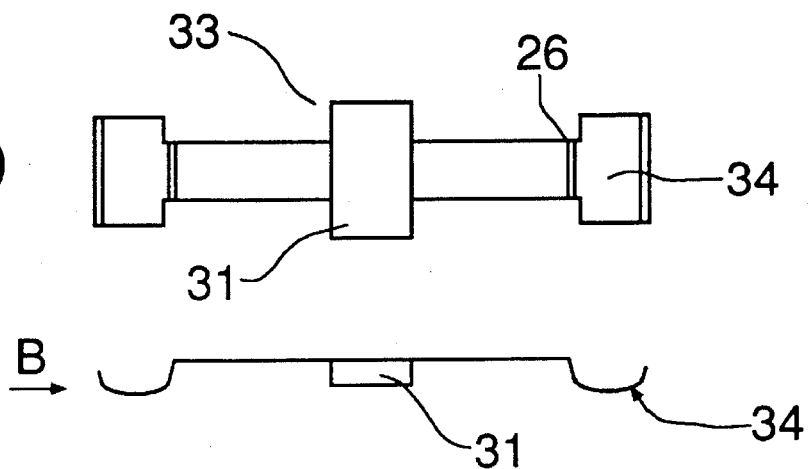
Figure 4C:
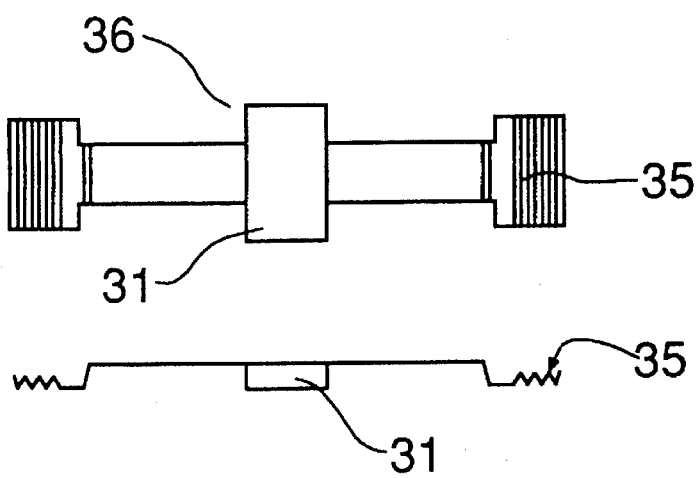

As representative of all the configurations 4A–4C and 5A–5C, in FIG. 4A the configuration of the pressure device 25 corresponding to FIG. 2C is indicated, the corresponding designations being provided with a prime.

It is intended to illustrate by this representation that all the configurations of FIGS. 4A–C and 5A–C can similarly be used advantageously for pressure devices of the type 25 (FIG. 2) and for pressure devices of the type 30 (FIG. 1). It goes without saying that other alternative versions of the end parts of the pressure devices are also conceivable.

With the configurations of FIGS. 4B and 5B, the following is achieved, for example, with regard to a cleaning effect.

Precleaning the tape front side of loose particles can be achieved upstream of the arcuate shape of the end part 34 or 39 in tape running direction (arrow B), then cleaning of firmly lodged particles or deposits can be accomplished in the center of the arc by increased bearing pressure forces, after which loose parts can then again be removed in the running-out region of the arc.

In the configuration 4A with flat contact part 27, a uniform, lower bearing pressure forces on a larger surface area of the tape 10 can be expediently achieved for gentle tape handling. However, the effective pressure-bearing area is dependent on the length of the bending-off in the perpendicular direction and/or on the angular position of the contact surface of the contact part 27 with respect to the tape 10 and with respect to the pressure element 29 A/29 B, respectively.

With the configuration according to FIG. 4C, multiple cleaning can be advantageously achieved by multiple linear bearing pressure.

In this case, starting from the first pressure-bearing line, there follow one after the other the phases: loosening and collecting of loose and firmly lodged particles and deposits. A multiple ribbed or channeled arrangement in this case increases the cleaning effect considerably.

In the versions of FIGS. 5A and 5C, a pressing and cleaning effect of the tape rear side is achieved with the use of felt, nonwoven, velour or other usual cleaning materials on the end parts 38 and 42, respectively.

Felt, nonwoven or velour materials are most suitable for use as pressing and cleaning coverings. Fibers are synthetic or natural fibers which can be processed to form such materials and are commercially available. In the case of magnetic tapes as recording medium, it is particularly important here for very long-fibered materials to be bonded with one another and for the risk of fiber particles occurring during production and/or operation of these materials to be as low as possible. However, it is also possible for a purely cleaning effect to use blade-shaped agate, sapphire, corundum or steel elements. These blade elements may preferably be used instead of the pressure elements 29 A/29 B, at least assigned to the tape front side.

Specific details on suitable knitted or woven parts (velour materials) or nonwovens which are suitable are contained below.

A pressing or cleaning covering comprising the knitted or woven parts and possibly a roughening part is produced as a knitted fabric in a knitting operation or as a woven fabric in a weaving operation. Subsequently, the surface is toughened, for example by short-bristle brushes, such that the knitted or woven bonds are partially destroyed or broken open and fiber ends partially protrude. By shearing off the fiber ends, a fleecy, suede-like surface is obtained, which is very suitable as a contact surface for tape rear and front side and head pole faces. The thicknesses of the knitted or woven parts are in this case about 0.5 mm or about 0.15 mm to about 0.3 mm, preferably about 0.25 mm, so that an overall thickness of the covering may amount to about 0.8 mm. In this case, an average fiber thickness of about 10 μm was used with a fiber weight of 1.5 g per 10,000 m. In general, an average fiber thickness of about 10 to about 25 μm can be used with fiber weights from about 1.5 to about 5 g/10,000 m.

The mass per unit area of the knitted/woven fabric was in this case about 160 to 180 g/m$^2$ (fiber thickness about 10 μm).

A nonwoven as covering comprises, for example, fibers of an average length of about 50 mm and a fiber thickness of about 15 μm with a mass per unit area from about 85 g/m$^2$ to about 110 g/m$^2$ or up to about 25 μm in cases of greater masses per unit area.

The mass per unit area of the fiber layers may, however, in principle lie in the range from about 30 to about 300 g/m$^2$ in order to be suitable in the technical sense and with the specified advantages for use for the present invention.

The thickness of the nonwoven covering was about 0.15 to about 0.6 mm, which applies in particular to the nonwoven layer in the adhesively affixed state. The quasi-statically measured coefficients of friction of the knitted/woven fabric and of the nonwoven against the tape rear side were about 0.35 and 0.38, respectively, measured by means of a steel drum covered with material 16 or 17, 18 of 10 cm diameter and a 180° wrap under loading of 20 g.

The thickness of the nonwoven should in practice be about 0.5 mm in the adhesively affixed state, but may also be chosen to be greater.

The nonwoven material is usually produced from fibers or microfibers which are bonded to one another purely mechanically, ie. hooked or matted, by means of bonding techniques, for example the effect of a water jet.

Bonding using thermal welding is likewise conceivable.

However, in this case the welding points should be chosen to be very small and, after welding, an approximately uniform thickness of the nonwoven should be ensured. Chemical fiber bonds are also known.

There should not be any binders, of whatever type, at least in the region of the covering touching the tape, since they may have extremely adverse or damaging effects on tape running and head functions.

The coverings can be adhesively affixed on the underlay by conventional adhesives, for example polyurethane or acrylic adhesives or a blended adhesive of polyurethane-butadiene-acrylonitrile. The covering may also be adhesively affixed for example by means of double-sided adhesive tape or in another suitable way.

The fibers of the coverings comprise, for example, polyamide fibers and polyester/polyamide microfibers with a fiber thickness (or diameter) from about 1 μm to about 15 μm. It goes without saying that all coverings may also comprise all other suitable fibers, such as for example polypropylene, polyacrylonitrile, regenerated cellulose, wool or cellulose triacetate.

It is also quite possible according to the invention to use combinations of felt, velour and nonwoven materials as pressing and/or cleaning material. Antifriction agents may be used in certain places even in such a combination, provided that they do not have lasting adverse effects on the pressing or cleaning characteristics and that they promote the running of the recording medium.

Particularly suitable as materials for the support element and extension arm of the pressure devices are spring steel, chrome-nickel steel and bronze. Support elements, extension arms and end parts may, however, also be advantageously produced from plastic, in particular injection-moldable plastic with spring characteristics. In general, adequate forces of recovery should be demanded of the material of the support element, so that a reversible deflection can be realized. For this purpose, the support element itself, or at least the extension arms, should have elasticity or spring characteristics.

A pressure device for recording media, in particular magnetic tapes, has at least one pressure element and comprises a support element. When the device is actuated by the head coming to bear, a deflection of the device takes place, and a pressing against the recording medium is automatically effected by means of at least one extension of the support element, said pressing ending automatically when the head is no longer in bearing contact.

The bearing pressure may take place directly on the tape rear side, but also indirectly on the tape front side or on both sides simultaneously. Pressing and/or antifriction and/or cleaning elements may also be arranged, at least partially, fixed in place with regard to the tape.

The invention can be used in the case of all cassettes, film and magnetic-tape systems.

We claim:

1. A cassette for a recording medium in tape form for use in a recording/reproducing apparatus comprising a scanning member, the cassette having a front wall with at least one entry opening for said scanning member, said at least one entry opening having a contour and tape guides adjacent to the inner side of said front wall and adjacent to said contour of the at least one entry opening, said recording medium extending between said tape guides and in a span over said entry opening and a pressure device which is arranged behind said entry opening and said tape span, there being provided, seen from the front side of the cassette, a fixed-in-place mounting element with bearing points for the pressure device at a distance from the center of said at least one entry opening, said pressure device having a resilient support element mounted on the mounting element and being provided with at least one pressure element interacting with said resilient support element, and the scanning member effecting in the operating position a reversible deflection of the resilient support element of said at least one pressure element; which cassette comprises extension arms projecting on both sides of said resilient support element laterally beyond said mounting element and having end parts, and counter pressure elements on said inner side of the front wall adjacent to said tape guides, where, when the scanning member is not introduced into the cassette and the resilient support element is thus in the non-deflected position, said end parts of said resilient support element do not contact the rear side of said recording medium or contact it substantially without any pressure, and when the scanning member is introduced into the cassette and the resilient support element is thus in the deflected position, the deflection pivots the resilient support element at the bearing points, making the resilient support element's end parts contact the rear side of the recording medium with pressure thereby urging the front side of the recording medium against said counter pressure elements of the cassette.

2. A cassette as claimed in claim 1, wherein a central pressure element is provided on the support element.

3. A cassette as claimed in claim 1, wherein the support element is provided with a cutout for the passage of a pressure element.

4. A cassette as claimed in claim 1, wherein the end parts of the extension arms are provided with side pressure elements for the recording medium.

5. A cassette as claimed in claim 4, wherein the side pressure elements comprise a material chosen from the group consisting of nonwoven, felt and velour material.

6. A cassette as claimed in claim 1, wherein the end parts are provided with antifriction elements for the recording medium.

7. A cassette as claimed in claim 1, wherein the end parts are designed as contact pressure elements for the rear side of the recording medium.

8. A pressure device as claimed in claim 7, wherein the end parts of the extension arms are designed as bent-off contact surfaces.

9. A pressure device as claimed in claim 7, wherein the end parts of the extension arms are designed as bent-off contact ribs.

10. A pressure device as claimed in claim 7, wherein the end parts of the extension arms are designed as bent-off arcuate or cylindrical moldings.

11. A cassette as claimed in claim 1, wherein the support element and the extension arms comprise a material chosen from the group consisting of spring steel, chrome-nickel steel and bronze.

12. A cassette as claimed in claim 1, wherein support element and extension arms consist of plastic.

13. A cassette as claimed in claim 1, wherein the end parts are designed as contact pressure elements for the rear side of the recording medium, and wherein, the counterpressure elements comprise of a material selected from the group consisting of nonwoven, felt, velour and antifriction polymer material.

14. A cassette as claimed in claim 13, wherein the material is one from the group of PTFE and high molecular weight polyethylene.

15. A cassette as claimed in claim 1, wherein the end parts are designed as contact pressure elements for the rear side of the recording medium, and wherein, the contact pressure elements, in the contact position against the tape rear side, press the front side of the recording medium against the counter-pressure elements with bearing pressure forces in the range from about 1 to about 10 cN.

16. A cassette as claimed in claim 15, wherein the bearing pressure forces lie in the range from about 2 to about 5 cN.

* * * * *